(12) United States Patent
Lachance et al.

(10) Patent No.: US 9,221,189 B2
(45) Date of Patent: Dec. 29, 2015

(54) APPARATUS AND METHOD FOR PERFORATING BEAMS

(75) Inventors: Jean-Francois Lachance, St-Jean-sur-Richelieu (CA); Benoit Maille, St-Alexandre (CA); Pierre Martel, St-Jean-sur-Richelieu (CA); Steeve Lepine, Blainville (CA)

(73) Assignee: BOIS D'INGENIERIE HYBRID JOIST INC., Quebec (CA)

( * ) Notice: Subject to any disclaimer, the term of this patent is extended or adjusted under 35 U.S.C. 154(b) by 1120 days.

(21) Appl. No.: 13/253,725

(22) Filed: Oct. 5, 2011

(65) Prior Publication Data

US 2012/0103472 A1 May 3, 2012

Related U.S. Application Data

(60) Provisional application No. 61/409,713, filed on Nov. 3, 2010.

(51) Int. Cl.
| *B27C 9/02* | (2006.01) |
| *B21D 28/24* | (2006.01) |
| *B23C 3/00* | (2006.01) |
| *B27C 9/04* | (2006.01) |
| *B27M 1/08* | (2006.01) |

(52) U.S. Cl.
CPC ............... *B27C 9/02* (2013.01); *B21D 28/243* (2013.01); *B23C 3/002* (2013.01); *B27C 9/04* (2013.01); *B27M 1/08* (2013.01); *Y10T 409/30112* (2015.01); *Y10T 409/302968* (2015.01)

(58) Field of Classification Search
CPC ............... B27C 9/00; B27C 9/02; B27C 9/04
USPC ................................. 409/185, 190, 191, 202
See application file for complete search history.

(56) References Cited

U.S. PATENT DOCUMENTS

| 5,560,177 | A | | 10/1996 | Brightwell | |
| 6,086,461 | A | * | 7/2000 | Williams | ................. B24B 7/12 |
| | | | | | 144/3.1 |
| 7,272,882 | B1 | * | 9/2007 | Onsrud | ........................... 29/564 |
| 7,423,734 | B1 | * | 9/2008 | Luik | ............................. 356/3.01 |
| 2005/0225172 | A1 | | 10/2005 | Brightwell | |
| 2008/0096746 | A1 | * | 4/2008 | Ryuhan et al. | .................. 483/30 |
| 2008/0134619 | A1 | | 6/2008 | Nichols et al. | |

FOREIGN PATENT DOCUMENTS

| CA | 2198838 A | 8/1997 |
| CA | 2497194 A1 | 10/2005 |

* cited by examiner

*Primary Examiner* — Shelley Self
*Assistant Examiner* — Matthew G Katcoff
(74) *Attorney, Agent, or Firm* — McDermott Will & Emery LLP

(57) ABSTRACT

This invention concerns an apparatus and method for perforating a beam. The apparatus comprises a main longitudinal support structure to support the beam. A cutting zone is located along the main longitudinal support structure. Controllable translating means translate the beam longitudinally in the cutting zone. A detector detects a presence of the beam in the cutting zone and in response, a router is controllably moved substantially orthogonally and transversally with respect to the beam, while the beam is translated. The combined controlled movement of the router and the beam results in a perforation of the beam following a predetermined perforation pattern.

20 Claims, 11 Drawing Sheets

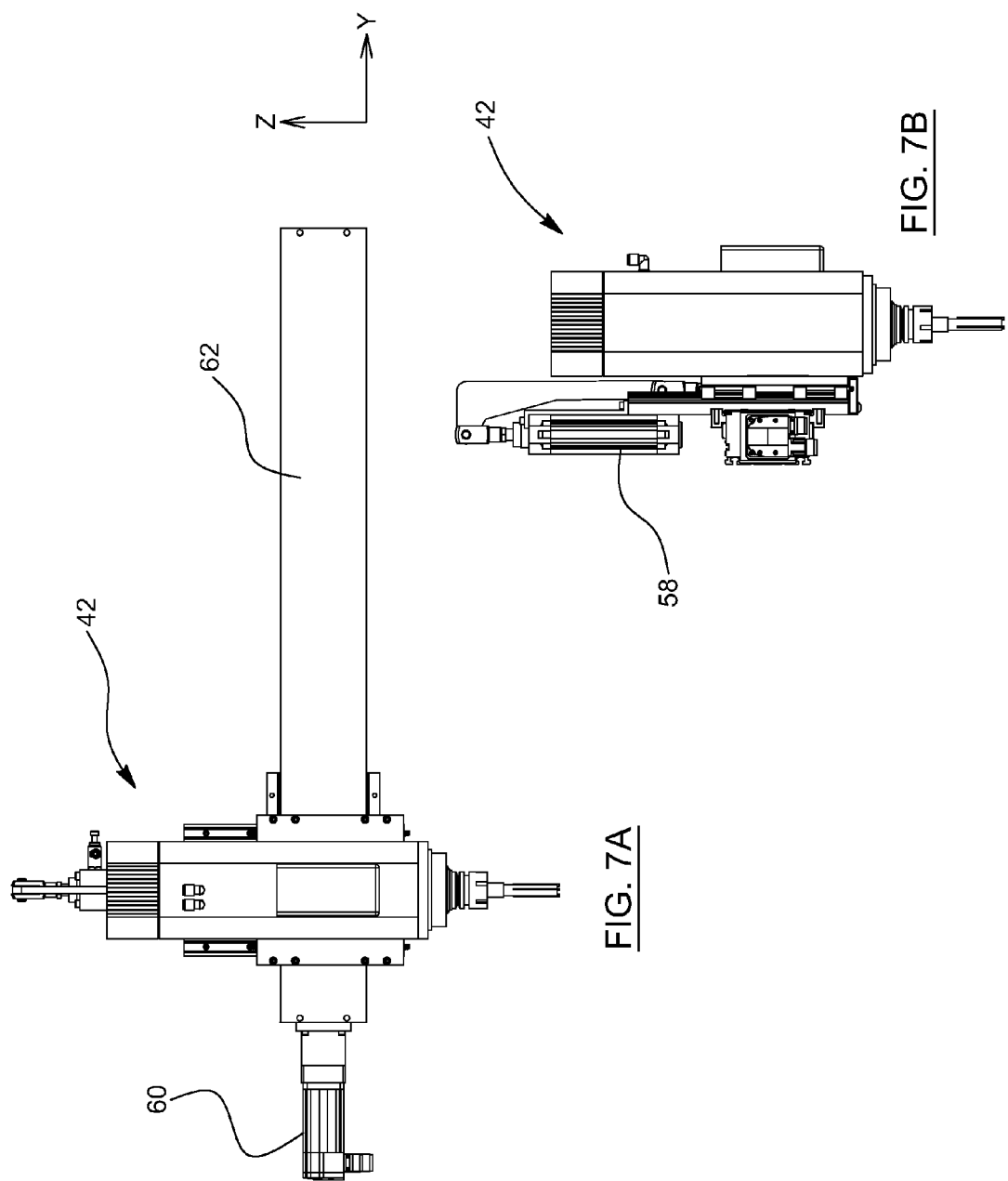

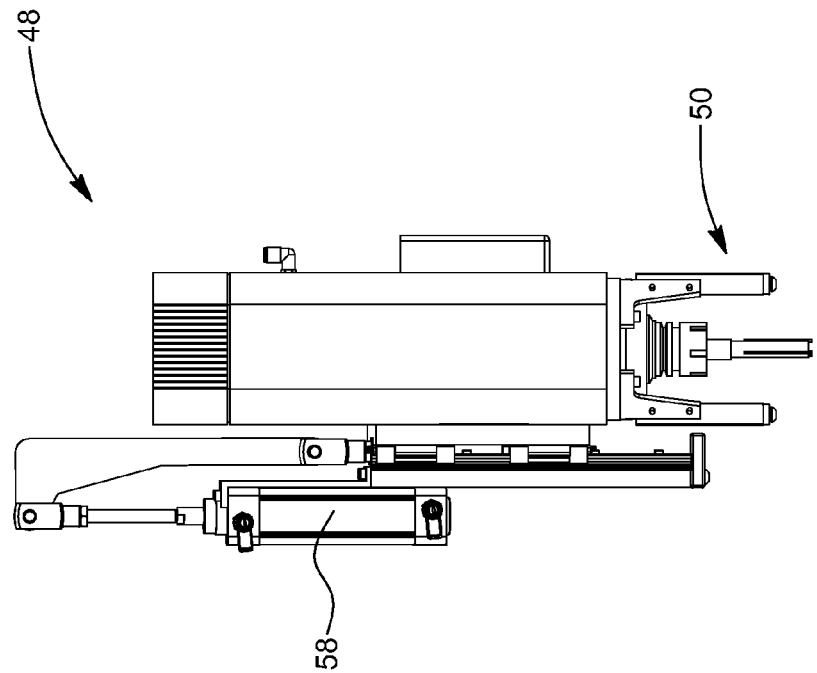
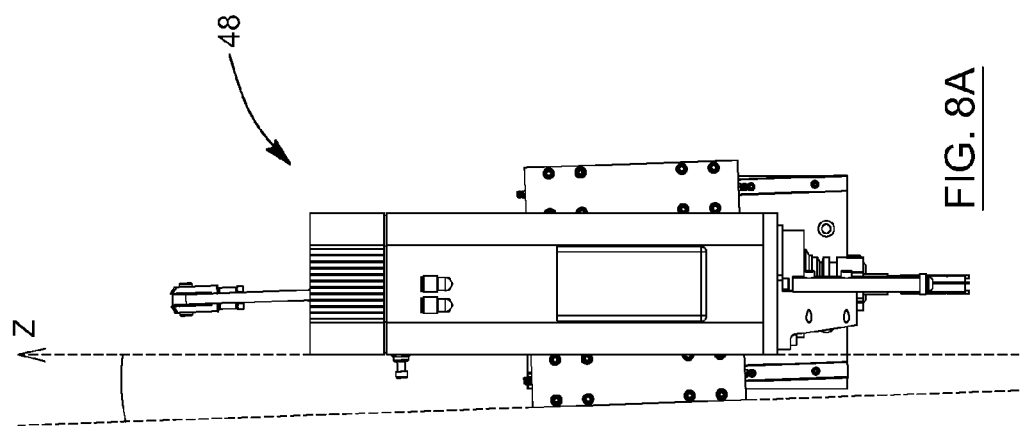

APPARATUS AND METHOD FOR PERFORATING BEAMS

CROSS REFERENCE TO RELATED APPLICATIONS

The present application claims priority from U.S. Provisional Application No. 61/409,713 filed on Nov. 3, 2010, the entire subject matter of which is incorporated herein by reference.

FIELD OF THE INVENTION

This invention generally relates to beam cutting, and more particularly concerns an apparatus and a method for perforating openings in beams.

BACKGROUND OF THE INVENTION

Wooden I-beams and I-joists are increasingly used in the construction industry, as they eliminate many of the problems that occur with conventional wooden joists.

I-joists are made of a web which is sandwiched between two flanges, such that the cross-section of these joists has an I-shape. The flanges are usually made from laminated veneer lumber or solid wood, and are grooved on one side to receive the web. The web is usually made from oriented strand board (OSB), plywood or laminated veneer lumber. The I-joist is assembled by gluing the web to the top and bottom flanges.

The advantage of I-joists is that the web resists shear forces while the flanges resist most types of pressure applied to the beam that can cause bending or breakage. Beam theory shows that the I-shaped form is very efficient for carrying both bending and shear loads in the plane of the web.

Although I-joists offer substantial advantages compared to conventional wood joists, the I-joist can fail if it is incorrectly altered. Constructions often require perforating and cutting holes in the web of the I-joists, so that air ducts, electrical wiring and plumbing pipes can pass through. Typical mistakes made by subcontractors include incorrectly placing or sizing holes in the web. Doing so can greatly compromise the strength of the joist.

In order to prevent this problem, I-joist distributers and wholesalers often use digitally controlled routers (also known as cnc routers) to cut or drill holes in the I-joists at specific locations. Such a system typically consists of a flat horizontal platform equipped with an XYZ grantry system on which a spindle router is mounted. The I-joist is maintained in place on the platform by clamps or by a vacuum. The yield of such systems is clearly limited, as an operator must manually position each individual I-joist on the platform before the router can cut it. Such systems are also limited with regard to the size of the holes they can cut in the web.

The Applicant is also aware of a system known as SawTek in which beams are moved longitudinally using a computer driven trolley. Such system is limited in terms of efficiency and productivity, since the beam must be stopped, and then clamped prior to being cut.

In order to prevent these problems, I-joists could be manufactured with pre-cut holes. The web of such joists could be cut or perforated prior to gluing the top and bottom flanges to it. However, distributers and wholesalers of joists are not inclined to assemble I-joists themselves, because the use of glue would require them to comply with strict environmental, security, performance and health standards.

There is therefore a need for an apparatus and method of perforating beams with increased yield. There is a need for an apparatus and method for perforating openings sized and positioned so that the strength of the beam is preserved. There is also a need for an apparatus and method which allow perforating the body portion or web of beam over their entire transverse height.

SUMMARY OF THE INVENTION

An object of the present invention is to provide an apparatus for perforating beams that satisfies at least one of the above needs.

According to the present invention, there is provided a cutting apparatus for perforating a beam, the beam having two longitudinal edges delimiting a body portion. The cutting apparatus comprises:
- a main longitudinal support structure for supporting the beam;
- a cutting zone located along the main longitudinal support structure;
- controllable translating means for translating the beam longitudinally in the cutting zone at a translation speed;
- a detector to detect a presence of the beam in the cutting zone and to generate a detecting signal accordingly;
- pressing means for pressing the longitudinal edges of the beam against the support structure while allowing a translation of the beam;
- a controllable router, the router being located in the cutting zone, said router being controllably movable substantially orthogonally and transversally with respect to the beam; and
- a controller including storing means for storing a predetermined perforation pattern, the controller being operatively connected to the translating means, the pressing means, the detector and the router. The controller has an input for receiving the detecting signal and outputs for sending control signals to the translating means, to control the translation speed, and to the router, to move the router closer or away from the beam, or to transversally translate the router and thereby perforate the body portion of the beam following the predetermined perforation pattern.

According to another aspect of the invention, there is also provided an apparatus for perforating a wooden beam with an I-shape cross-section, the beam having two longitudinal flanges interconnected by a central web. This apparatus comprises the same elements as described above, where the pressing means presses the flanges of the beam against the support structure and where the router perforates the web of the beam.

According to the present invention, there is also provided a method for perforating a beam, the beam having two longitudinal edges delimiting a body portion. The method comprises the steps of:
a) controllably translating the beam longitudinally along a main longitudinal support structure, at a translation speed;
b) detecting a presence of the beam in a cutting zone located along the main longitudinal support structure at a detecting time;
c) pressing the longitudinal edges of the beam against the support structure while allowing a translation of the beam;
d) based on the detecting time and on the translation speed, and while longitudinal edges of the beam are being pressed, controllably moving a router provided with a rotatable cutter substantially orthogonally to the beam until the cutter perforates the body portion of the beam, the router being then in a cutting position;

e) while maintaining the router in the cutting position, controllably translating the router transversally with respect to the beam and controllably translating the beam, thereby perforating the body portion of the beam following a predetermined perforation pattern;

f) once the body portion of the beam is perforated as per the predetermined perforation pattern, moving the router substantially orthogonally and away from the beam in a un-cutting position; and g) translating the perforated beam away from the cutting zone.

According to another aspect of the present invention, there is also provided a method for perforating a wooden beam having an I-shape cross-section, said beam having two longitudinal flanges interconnected by a central web. This method is similar to the one described above, however in this method, the flanges of the beam are pressed in step c) and it is the web of the beam that is perforated according to the predetermined pattern.

BRIEF DESCRIPTION OF THE DRAWINGS

FIG. 7A is a front view of a router of the apparatus of FIG. 1, and FIG. 7B is a side view of the router of FIG. 7A;

FIG. 8A is a front view of a second router of the apparatus of FIG. 1, while FIG. 8B is a side view of the router of FIG. 8A;

Figure 1:
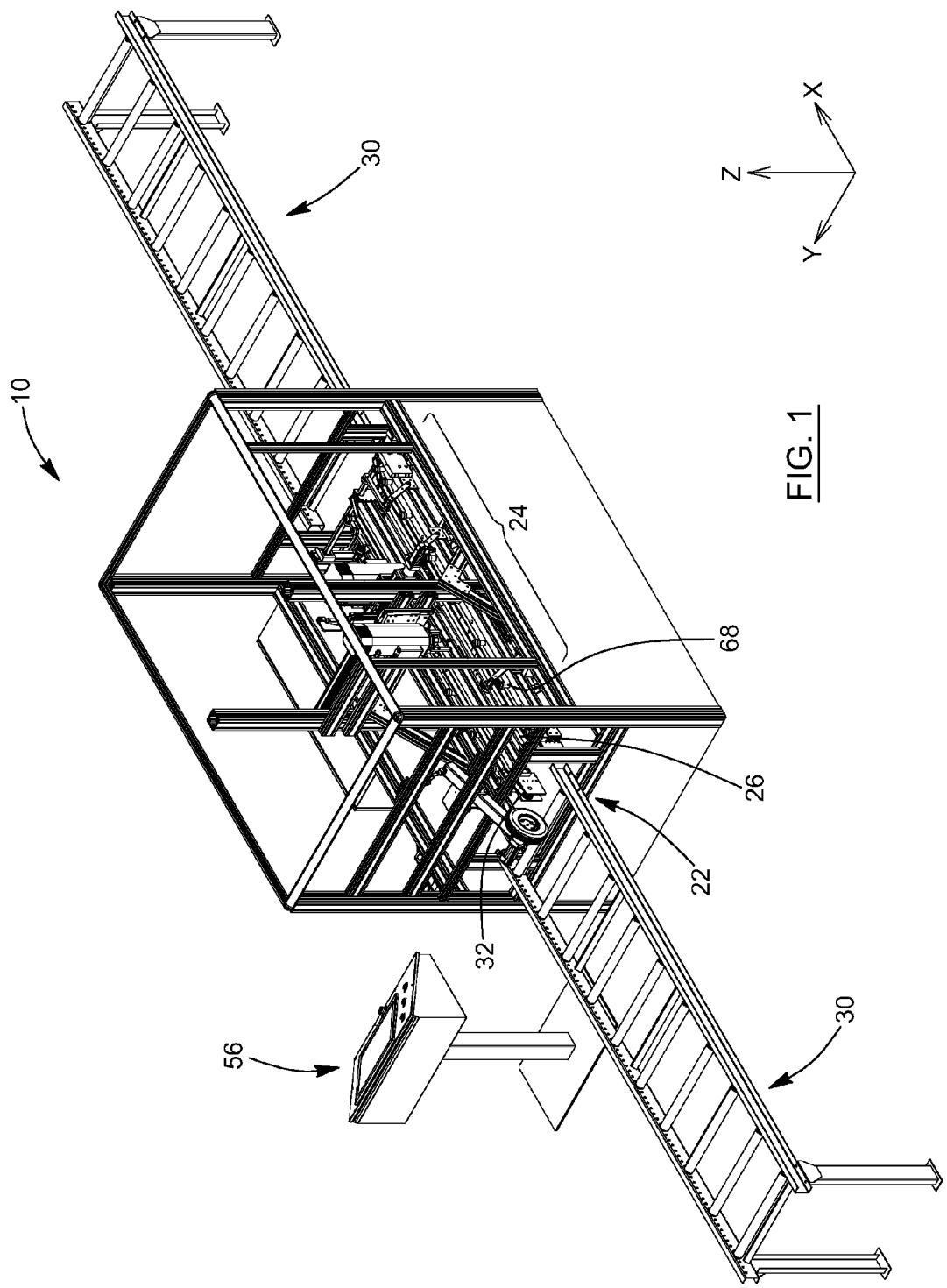
FIG. 1 is a top front perspective view of an apparatus according to a preferred embodiment of the present invention.

While the invention will be described in conjunction with example embodiments, it will be understood that it is not intended to limit the scope of the invention to such embodiment. On the contrary, it is intended to cover all alternatives, modifications and equivalents as may be included as defined by the present description and appended claims.

DESCRIPTION OF PREFERRED EMBODIMENTS

In the following description, similar features in the drawings have been given similar reference numerals and in order to lighten the figures, some elements are not referred to in some figures if they were already identified in a precedent figure.

Figure 10:
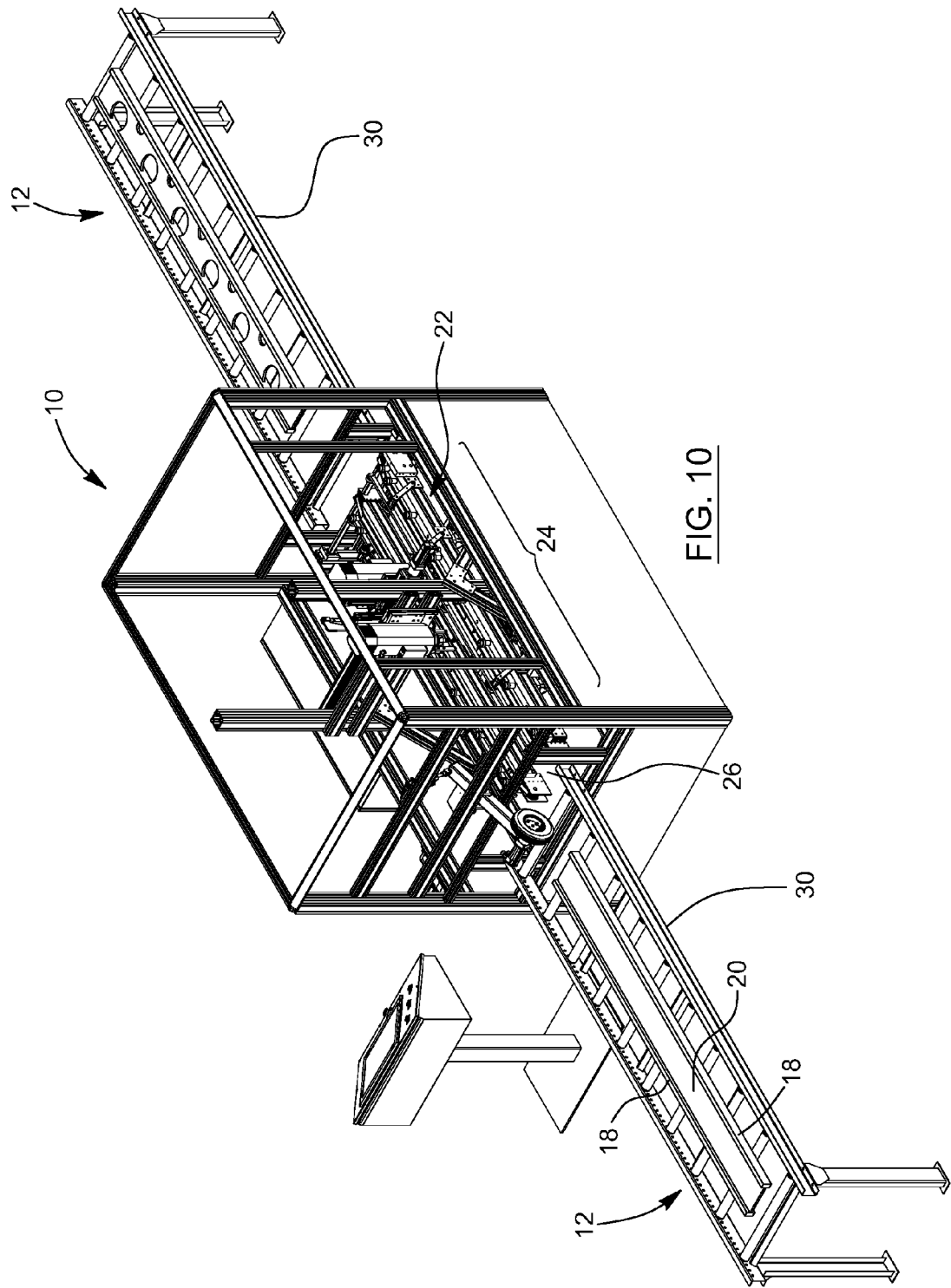
FIG. 10 is a top front perspective view of the apparatus of FIG. 1, with an I-beam prior its entry in the cutting zone, and an I-beam perforated with arc-shape openings after its passage the cutting zone.
Figure 11:
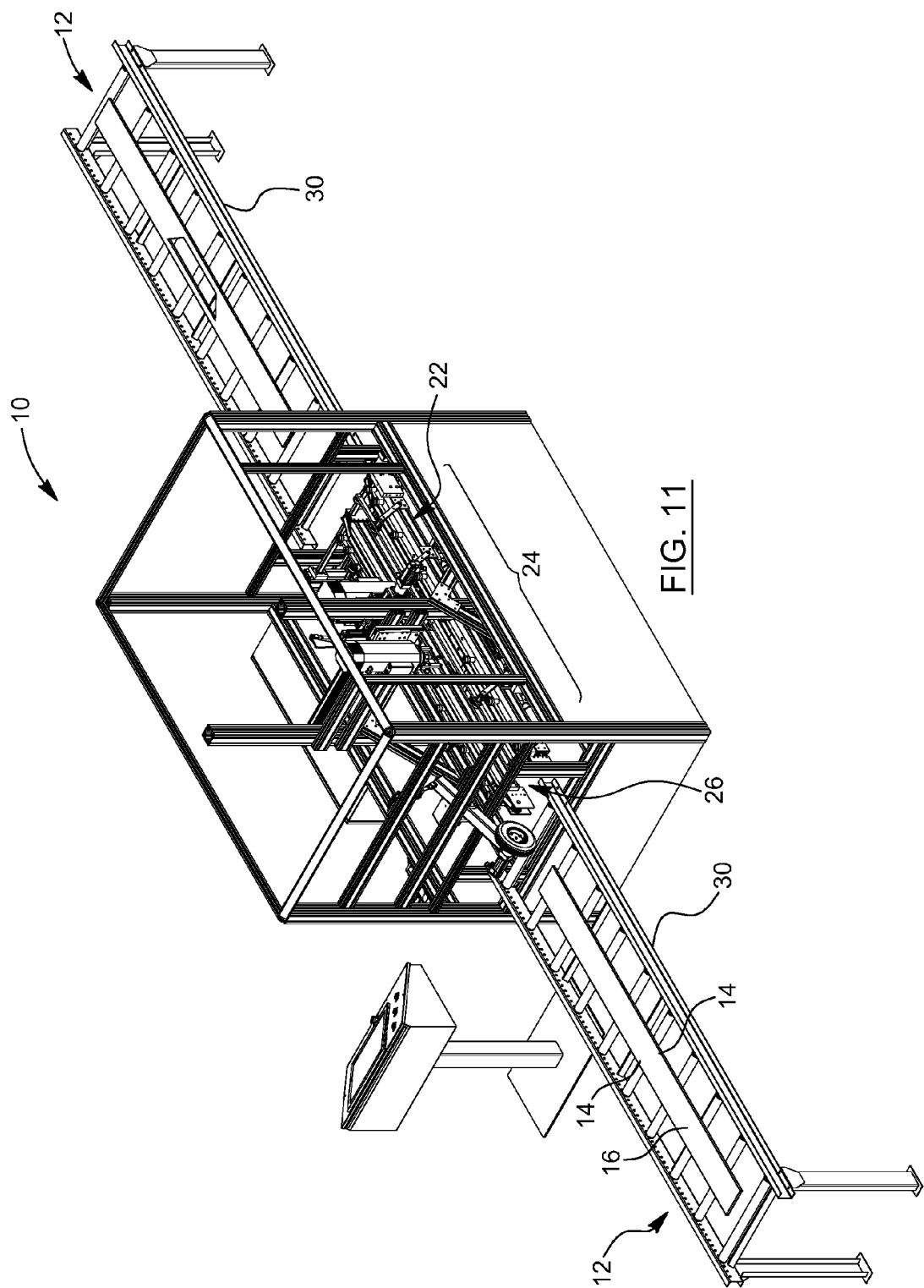
FIG. 11 is a top front perspective view of the apparatus of FIG. 1, with a beam prior its entry in the cutting zone, and a perforated beam with a trapezoidal opening after its passage it the cutting zone.

Referring to FIGS. 1 to 6 and 10 to 11, a cutting apparatus 10 for perforating a beam 12 (only shown in FIGS. 10 and 11) is provided. The cutting apparatus 10 can perforate various types of beams made of different materials such as wood, oriented strand board, metal or plastic. The beam may also have different shapes. For example a beam 12 can be shaped as a flat board with two longitudinal edges 14 delimiting a body portion 16 (as shown in FIG. 11). Another example is an I-beam, which is a beam 12 with an I-shape cross-section, such as wooden I-beam (or I-joist), formed by two longitudinal flanges 18 interconnected by a central web 20 (as shown in FIG. 10).

The cutting apparatus 10 comprises a main longitudinal support structure 22 for supporting the beam 12. The support structure mainly comprises framing elements, for example made of aluminum, to support the beams 12. A cutting zone 24 is located along the main longitudinal support structure 22. Preferably, roller conveyors 30 are placed downstream and upstream of the cutting zone 24, for facilitating the processing of the beams 12.

The apparatus 10 also includes controllable translating means 26 for translating the beam longitudinally in the cutting zone 24, at a given translation speed. This translation speed can be positive or negative, for respectively allowing a longitudinal translation of the beam in a forward or backward direction. The beams pass through the system in a forward direction; however they can be translated in the backward direction during the perforation process, as it will be explained later.

Figure 4:
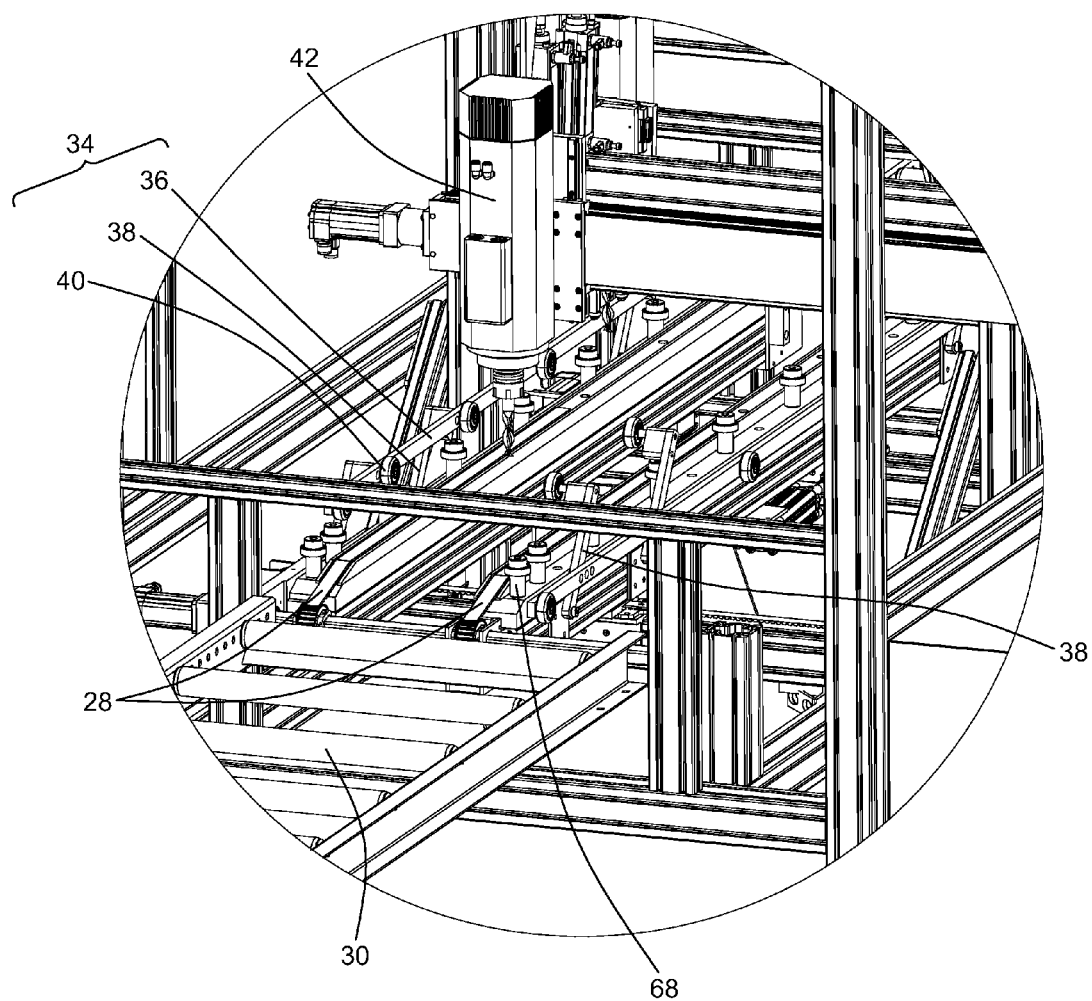
FIG. 4 is a partial close-up view of a back side of the apparatus of FIG. 1.
Figure 5:
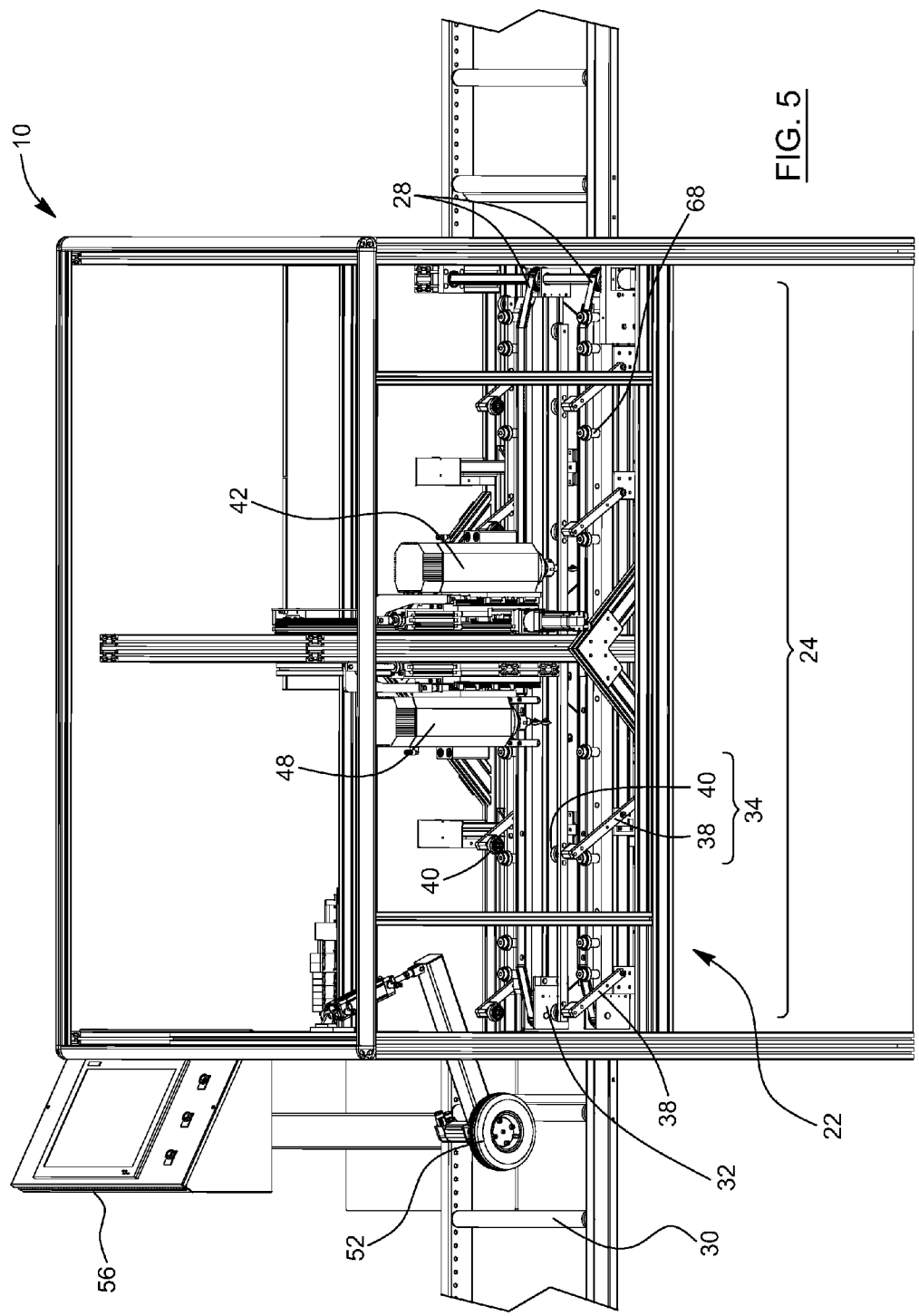
FIG. 5 is a partial top perspective view of one side of the apparatus of FIG. 1.
Figure 6:
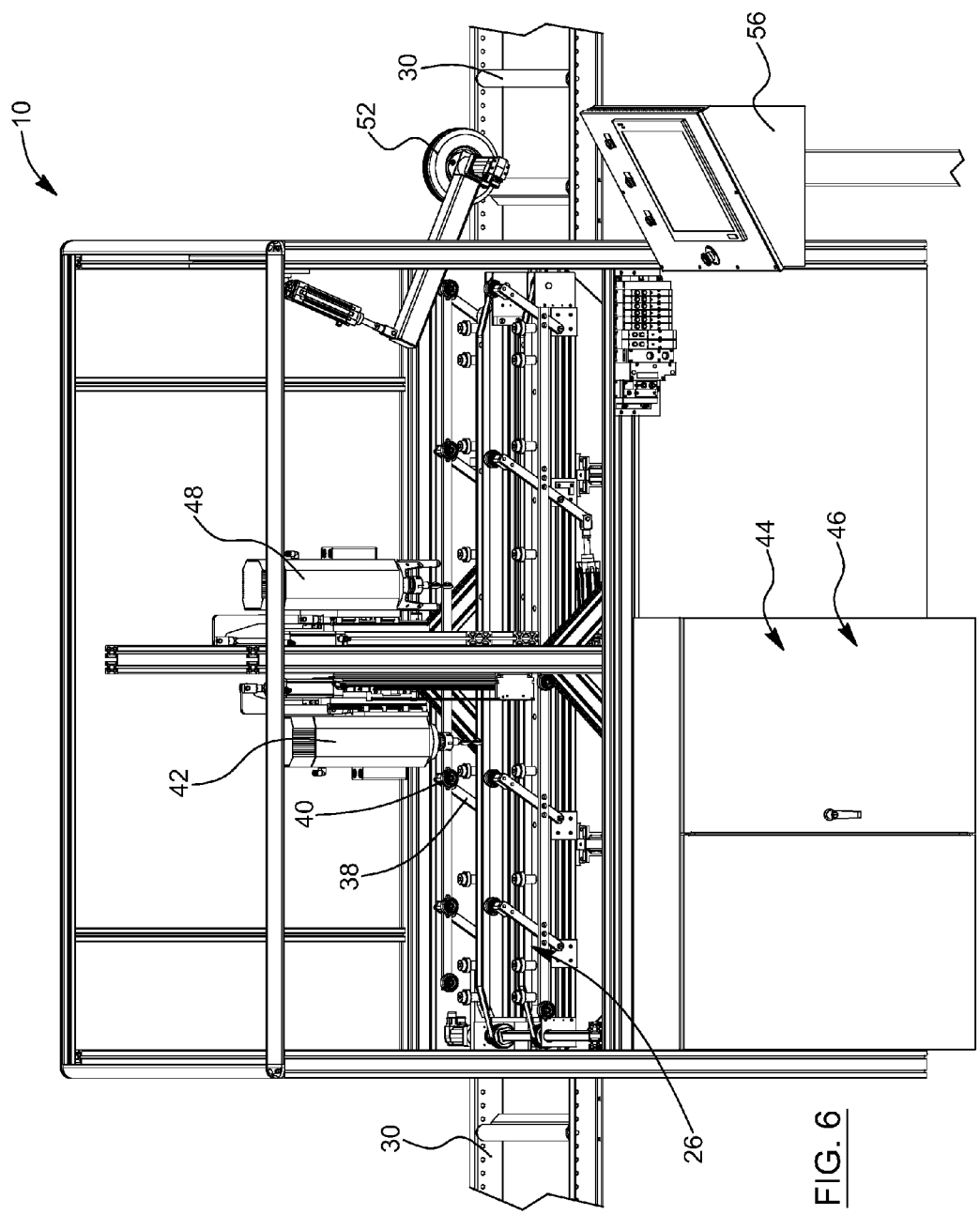
FIG. 6 is a partial top perspective view of the other side of the apparatus of FIG. 1.

In this preferred embodiment of the apparatus, and best shown in FIG. 4, the translating means 26 include a pair of conveying flat belts 28, each belt receiving either the longitudinal edges or the flanges of the beam, depending on the type of beam being fed to the apparatus. Preferably, one of the conveying belts 28 is movable transversally in order to be adjusted to the transverse height of the beam. This characteristic advantageously allows the apparatus to process beams of different heights, varying for example between 9½" and 24" inches. The belts are coupled to servomotors controlled by a controller 44. Of course, other types of translating means can be used.

A detector 32, such as a sensor, is used in order to detect the presence of the beam 12 in the cutting zone 24. The detector then generates a detecting signal accordingly. The detector is preferably located at the entry of the cutting zone, but it could be place elsewhere, as long as it is located upstream (or prior) to the first cutting tool.

The apparatus 10 is also provided with pressing means 34, for pressing the longitudinal edges 14 (or flanges 18, depending of the type of beam being conveyed) of the beam 12 against the support structure 22. The pressing means 34 advantageously prevent the beam 12 from slipping or rotating when the beam is being translated or perforated. Best shown in FIGS. 4 and 5, the pressing means 34 preferably include a pair of longitudinal bars 36. Each bar 36 extends longitudinally on one of the sides of the cutting zone 24. Pivotable rods 38 support the longitudinal bars. Each rod is rotatably affixed at one end to the support structure and rotatably affixed at its other end to one of the bars 36. Rotatable free wheels are mounted on the longitudinal bars, and are able to rotate against the longitudinal edges of the beam. Preferably, the pressing means are controllable, and can press or free the beam in response to the detection of the beam in the cutting zone.

The apparatus 10 includes a controllable router, located in the cutting zone 24. The router 42 is provided with cutting tool, for example a rotatable cutter, for perforating the beam 12. The router can be controllably moved substantially orthogonally and transversally with respect to the beam. In other words, if the beam is translated along an X axis, the router is movable along a Y axis and a Z axis. FIGS. 7A and 7B show an example of such router 42. Preferably, the router 42 is translated transversally along an endless screw, and using a servo-motor. Movement of the router 42 in the Z direction is made using a pneumatic cylinder. Of course, other means can be considered to move the router.

Figure 9:
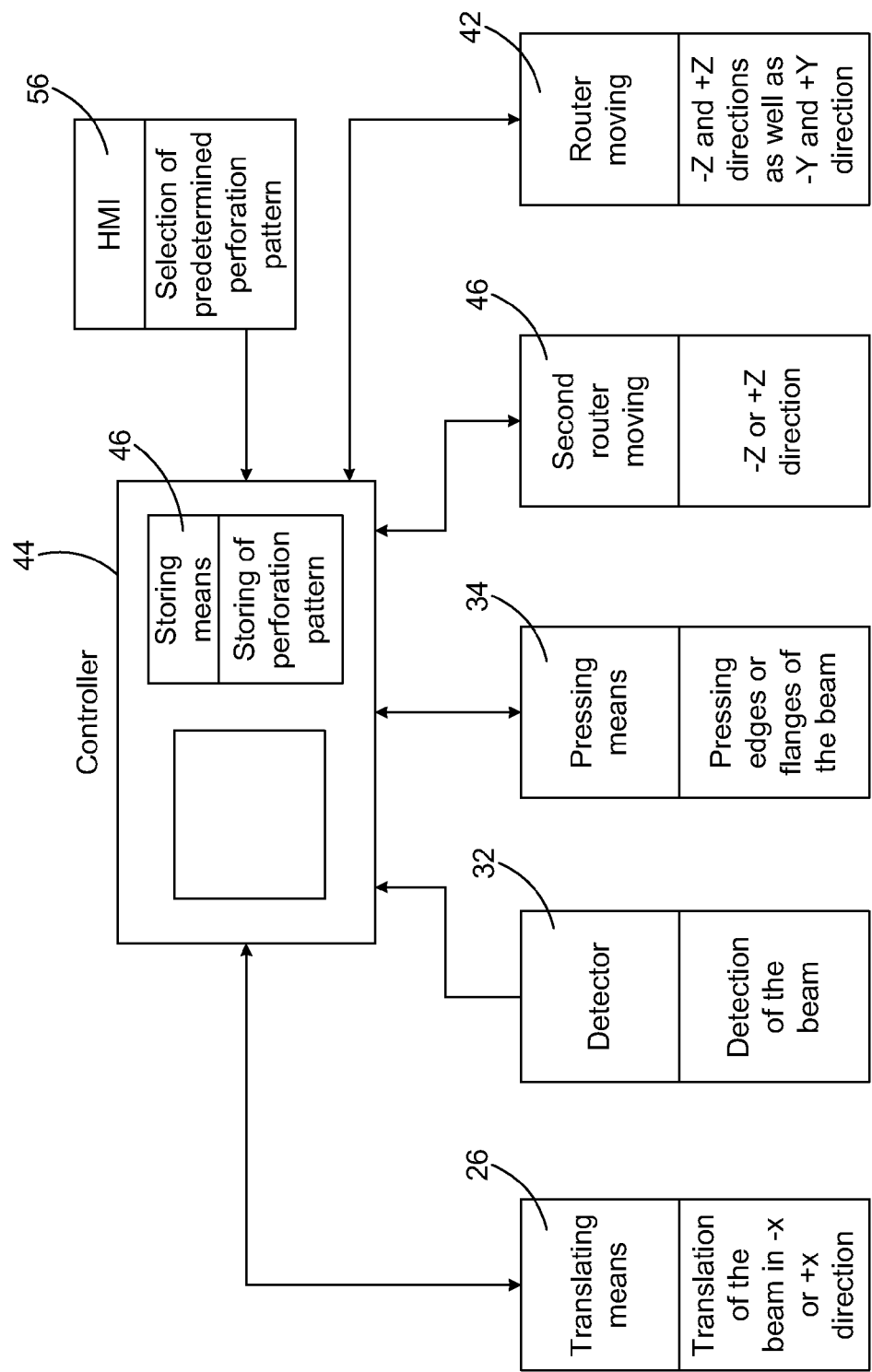
FIG. 9 is a simplified schematic diagram illustrating elements of the apparatus of FIG. 1 and actions accomplished by these elements.

The apparatus 10 also includes a controller 44 and storing means 46 for storing a predetermined perforation pattern. The controller 44 can be for example a programmable logic controller (PLC), as commonly used for automation of industrial processes, a personal computer (PC), a server, or a combination of such elements. It is understood that the controller 44 may also be distributed over several PLCs (or the likes), PCs or servers. The predetermined perforation pattern may for example be stored on the hard disk of a PC. As schematically shown in FIG. 9, the controller 44 is operatively connected to the translating means 26, the pressing means 34, the detector 32 and the router 42. The controller 44 has at least an input for receiving the detecting signal from the detector and several outputs for sending control signals. The controller sends control signals to the translating means, in order to control the translation speed of the beam; the pressing means, in order to press or free the beam; and the router, in order to control movement of the router closer or away from the beam (along a Z axis), and to control the translation of the router (along a Y axis). By controlling motion of the translating means, the pressing means and the router, the beam can be perforated following the predetermined pattern.

By combining the translation of the beam 12 in its longitudinal direction, and the movement of the router 42 in a transverse direction with respect to the beam, openings having various shapes can be cut into the beam, and this, at an increased yield. Of course, the router 42 must first be lowered in a cutting position such that its cutter goes through the beam.

In this preferred embodiment, the cutting apparatus 10 further comprises a second controllable router 48. Just as the router 24, this second router 48 is also located in the cutting zone 24. Although in the embodiment illustrated the second router 48 is shown upstream of the router 42, it is also possible to place it downstream of router 42.

Best shown in FIGS. 8A and 8B, this second router 48 is controllably movable substantially orthogonally with respect to the beam 12. By substantially orthogonally, it is meant that the router can be moved normally, or almost normally, with respect to the beam. In other words, the router does not need to be moved exactly at right angle with respect to the beam, and a tolerance of a few degrees is acceptable. The controller is operatively connected to the second router 48. The controller thus further comprises an output for sending control signals to the second router 48, in order to move the second router closer to the beam to a cutting position, or away from the beam to an un-cutting position. Thus the second router 48, when in the cutting position, perforates the beam 12 with a longitudinal groove which corresponds to a portion of the predetermined perforation pattern. In other words, since the router 48 is only movable along a Z axis with respect to the beam, it can be controlled so as to perforate linear grooves or cuts in the beam, corresponding to linear portion of the predetermined pattern. Using a second router 48 within the apparatus advantageously allows increasing the capacity, or yield, of the apparatus. Preferably, a pneumatic cylinder is used to translate the router 48, but other means can be envisaged.

In this preferred embodiment, and referring to FIG. 8B, a guide 50 is mounted to the second router 48 and is adapted to rest against one of the flanges 18 of I-beams when the router 48 is in the cutting position. Preferably, the guide 50 includes rolling bearings, for rolling against an internal side surface the flange 18.

Best shown in FIG. 8A, the second router 48 preferably moves following a slightly slanted trajectory to the cutting position. This feature facilitates a perforation at the junction of the web 20 and one of the flanges 18, are required when cutting wooden I-joists. More specifically, it allows the web to be perforated flush with a lateral side of the flanges.

As shown in FIG. 11, the predetermined perforation pattern can include at least one trapezoidal opening 64, for which its parallel edges are parallel to the edges 14 (or flanges 18, in the case of I-beams). The manufacturing of beams 12 with such openings 64 is particularly advantageous for the construction industry, as open web wood joists offer greater flexibility for accommodating air ducts, electrical wiring and plumbing.

Referring to FIG. 10, the predetermined perforation pattern can also include multiple arc-shaped openings 66, strategically sized and positioned so as to preserve the structural strength of the beam.

Figure 2:
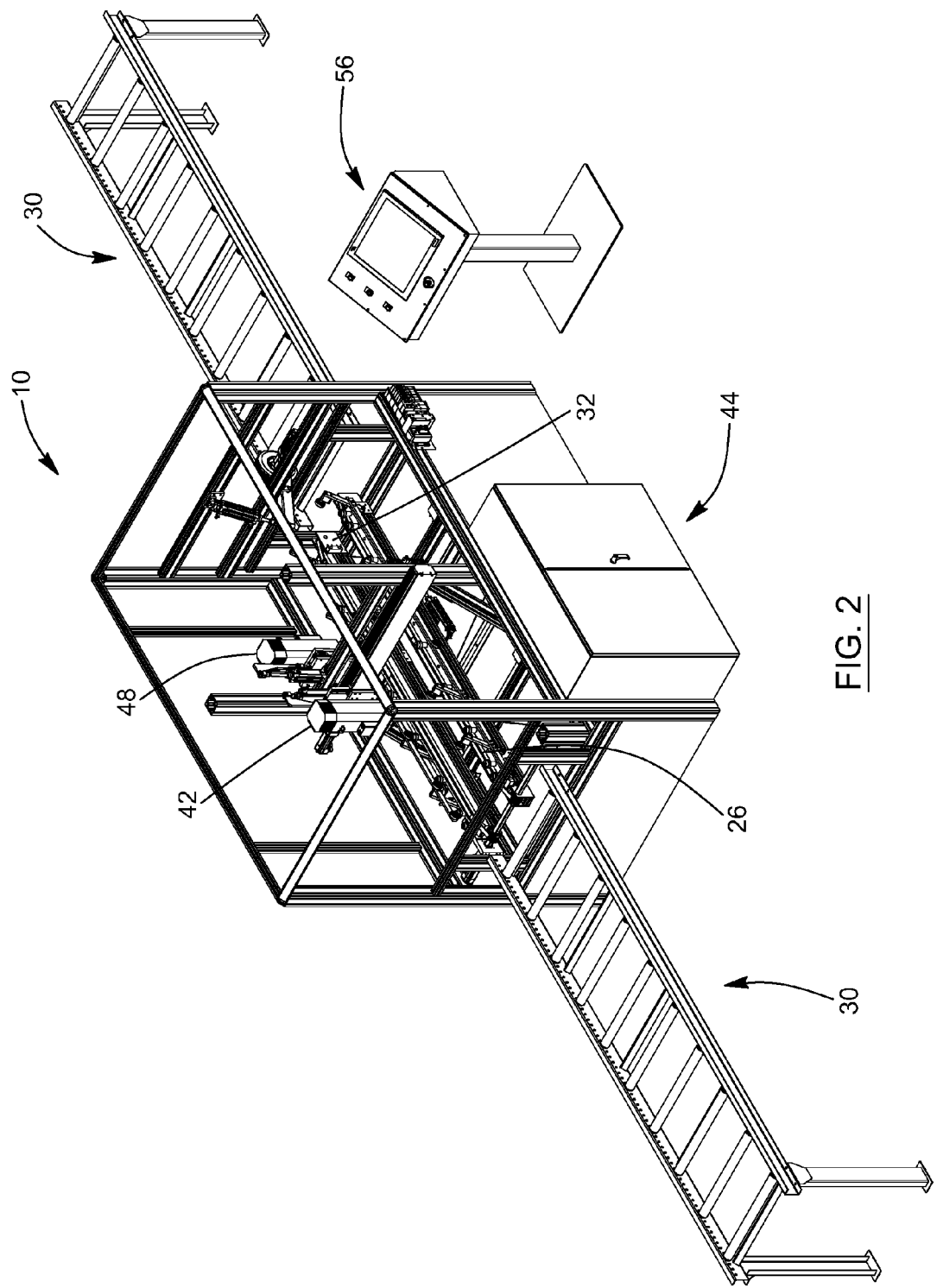
FIG. 2 is top back perspective view of the apparatus of FIG. 1.

As shown in FIGS. 1 and 2, the apparatus 10 is provided with a user interface 56 (or human machine interface), which is operatively connected to the controller 44. In addition, several different predetermined perforation patterns can be stored within the storing means 46, in order to allow an operator to select the predetermined perforation pattern from this group of different predetermined perforation patterns. Of course, the patterns can be adapted to the specific size of the beams to be perforated.

Figure 3:
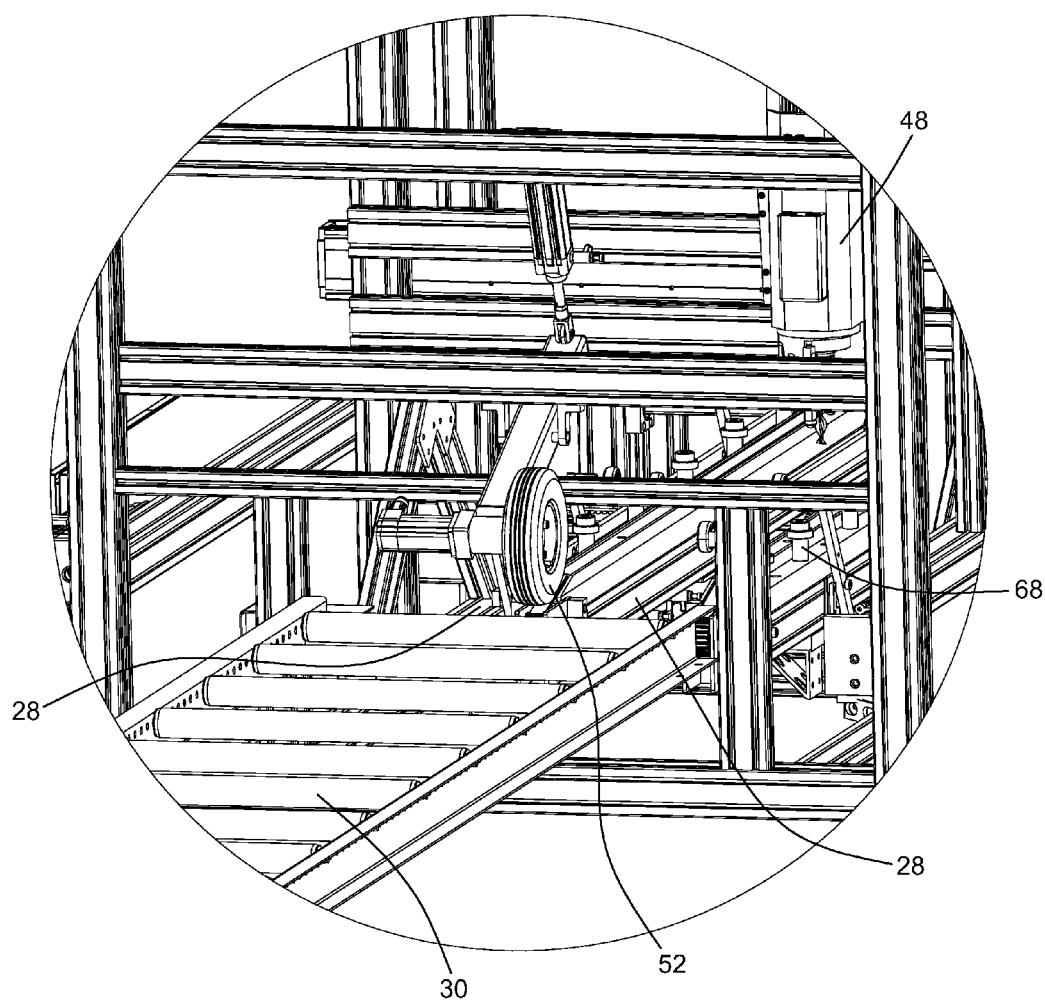
FIG. 3 is a partial close-up view of a front side of the apparatus of FIG. 1.

Best shown in FIG. 3, the cutting apparatus 10 preferably comprises a motorized feeding wheel 52, located along the main longitudinal support structure 22, and upstream of the cutting zone 24, the controller being operatively connected to the motorized feeding wheel, for regulating entry of the beam into the cutting zone.

The following paragraphs describe more specifically a preferred method according to which the beams 12 are perforated. The steps explained in details below are described for the perforation of a wooden I-beam, and they are similar in the case of a flat beam.

An operator first selects a predetermined perforation pattern on a user interface 56 (or human machine interface). The perforation pattern can be selected from a group of different perforation patterns, which can vary according to the size of the beam 12 to be perforated, such as the height of the beam 12, its length, the size of its flanges, the thickness of its web, etc. Perforation patterns are generally pre-programmed and can include one or several openings, of different sizes and shapes. The predetermined perforation pattern is stored in the hard disk of a computer, but other storing means 46 can also be used. Alternatively, when the size of the beams and the openings to be cut are always the same, there can be only one predetermined perforation pattern stored, and no selection from the operator is required.

In the case where the perforation pattern is selected amongst a group of patterns, automatic adjustments are made to the apparatus 10. One of the conveying belts 28 is moved transversally in order to be aligned with the flanges of the beam to be conveyed. The transverse distance between lateral guides 68 located on both sides of the cutting zone are also adjusted. These guides 68 are devised to roll against the external face of the lateral sides of the flanges when it is moved in the cutting zone 24. In the case of a flat beam, the guides 68 would roll against the lateral sides of the beam.

One or several beams to be perforated are placed on roller conveyors, prior their translation in the cutting zone 24. A beam 12 can be introduced manually in the cutting zone 24, by an operator, or alternatively, its translation can be initiated using the motorized feeding wheel 52. Using the feeding wheel 52 allows to regulate the entry of beams 12 into the cutting zone 24, ensuring for example that beams are not introduced while the routers 42, 48 are being pre-heated.

The beam 12 is then controllably translated longitudinally, along the main longitudinal support structure 22. The beam 12 is translated at a given translation speed, which is generally positive, but which can also be negative during the perforation process.

The presence of the beam 12 is then detected in the cutting zone 24 at a given detecting time. In response to the detection of the beam 12, the flanges 18 (or edges 14 in the case of flat beams) are pressed against the support structure 22, while still allowing the beam 12 to be translated. In the embodiment illustrated, the beam 12 is (or edges) pressed by lowering a set of rotating wheels 40 over the flanges 18 of the beam. Of course, in other embodiments, the pressing of the flanges or edges of the beam can be done independently from the detection of the beam. For example, the beam can be continuously pressed, even prior the detection of the beam in the cutting zone, as long as the beam is pressed while being perforated.

Based on the detecting time and on the translation speed, and while continuously pressing the beam 12 against the support structure 22, a router 42 is controllably moved substantially orthogonally to the beam 12 until its cutter perforates the web 20 of the beam (or body portion 16, in the case of a flat beam). The router 42 is then in a cutting position.

While the router 42 is maintained in the cutting position, the router 42 is controllably translated transversally with respect to the beam 12 and since the beam 12 is continuously moved in its longitudinal direction, the cutter thereby perforates the beam following the predetermined perforation pattern. Of course, movement of the router 42 and the conveying belt 28 is controlled by the controller 44, which consists in this specific example of the combination of a computer, a linear motion controller and a set of drives.

Once the web 18 (or body portion 16) of the beam 12 is perforated as per the predetermined perforation pattern, the router 42 is moved substantially orthogonally and away from the beam 12 in an un-cutting position. The perforated beam 12 is then translated away from the cutting zone 24, towards the exit of the apparatus.

Depending on the desired yield for the process, or on the types of openings to be cut in the beam, the method can further comprise the following steps.

In addition to the router 42, the second router 48 can also be used. Prior to cutting the beam 12 with the router 42, the second router 48 can be used in order to perforate a longitudinal groove (or cut) in the beam 12. Since the second router 48 is only able to move substantially downwardly and upwardly, that is, along a Z axis, one can understand that the second router 48 can only perform linear perforations.

Using a second router 48 advantageously allows perforating beams 12 more rapidly. For example, and with reference to FIG. 11, when the predetermined perforation pattern includes a trapezoidal opening having a long side parallel to a short side, a first lateral side and a second lateral side interconnecting the long side and the short side, the second router 48 cuts the long side first and then the router 42 cuts successively the first lateral side, the short side and the second lateral side of the trapezoid. Using two routers 42, 48 allows to continuously translate the beam in the same direction (or in other words, with a positive speed) rather than having to translate it backwardly. Translating the beam continuously in the same direction allows processing more beams during a given period of time.

Of course, when the routers are configured as illustrated in FIGS. 1 to 6 and 10 to 11, some openings may require the beam to be translated backwardly during the perforation process. That is the case for example when circles, or arc-shaped openings as illustrated in FIG. 10, are part of the perforation pattern. In the case of an arc-shaped (or truncated disc) formed by a straight line which ends connect to a curved line, the router 42 can cut the opening according to the arc-shaped pattern, the beam having to be translated in a frontward and backward direction in order to cut the opening.

Of course, while in the embodiment shown the second router first perforates the beam, in other embodiment the second router 48 can perforate the beam after the router 42. In addition, while FIGS. 10 and 11 show the beam being translated in a lay down (or horizontal) position, in other embodiments, the beam can be translated upwardly, that is, having one of its lateral sides lying against the main longitudinal support. In such a configuration, the router would be shifted by 90 degrees with respect to the orientation they have in FIGS. 7 and 8. Yet in other embodiments, the beam can be translated horizontally, and the routers can be located underneath the beam 12. Yet still in other embodiments, two routers able to move in the Z and Y direction can be used.

Of course, the steps of the method described above are preferably performed continuously in order to sequentially process series of beams.

Numerous modifications could be made to the embodiments above without departing from the scope of the present invention.

What is claimed is:

1. A cutting apparatus for perforating beams, each of said beams having two longitudinal edges delimiting a body portion, said cutting apparatus comprising:
   a main longitudinal support structure;
   a cutting zone located along the main longitudinal support structure;
   a controllable conveying assembly comprising at least one conveying belt located in the cutting zone, supporting and translating the beams one after the other longitudinally along a conveying direction, at a translation speed;
   a detector to detect a presence of a beam in the cutting zone and to generate a detecting signal accordingly;
   a pair of longitudinal bars provided with rotatable free wheels, the longitudinal bars being aligned with the longitudinal edges of the beams, the rotatable free wheels pressing the longitudinal edges of the beam against the at least one conveying belt;
   a controllable router, the router being located in the cutting zone, said router being controllably movable substantially orthogonally and transversally with respect to the beam; and
   a controller including a hard disk for storing a predetermined perforation pattern, the controller being operatively connected to the conveying assembly, the detector and the router, the controller having an input for receiving the detecting signal and outputs for sending control signals to:
      the at least one conveying belt, to control the translation speed; and
      the router, to move the router closer or away from the beam, or to transversally translate the router;
   and thereby perforate the body portion of the beam following the predetermined perforation pattern.

2. The cutting apparatus according to claim 1, further comprising:

a second controllable router, the second router being located in the cutting zone, said second router being controllably movable substantially orthogonally with respect to the beam, the controller being operatively connected to the second router and further comprising:

an output for sending control signals to the second router to move the second router closer to the beam to a cutting position, or away from the beam to an un-cutting position, whereby the second router, when in the cutting position, perforates the beam with a longitudinal groove, corresponding to a portion of the predetermined perforation pattern.

3. The cutting apparatus according to claim 1, further comprising:

linkages for supporting the longitudinal bars, the linkages being affixed to the support structure and to the longitudinal bars, for raising or lowering the rotatable free wheels against the longitudinal edges of the beams.

4. The cutting apparatus according to claim 3, wherein the linkages are controlled by the controller, the controller further comprising outputs for sending control signals to the linkages to press or free the beam in response to the detecting signal.

5. A cutting apparatus for perforating wooden beams with an I-shape cross-section, each of said beams having two longitudinal flanges interconnected by a central web, said cutting apparatus comprising:

a main longitudinal support structure;

a cutting zone located along the main longitudinal support structure;

a controllable conveying assembly comprising at least one conveying belt located in the cutting zone, supporting and translating the beams one after the other longitudinally along a conveying direction, at a translation speed;

a detector to detect a presence of a beam in the cutting zone and generate a detecting signal accordingly;

a pair of longitudinal bars provided with rotatable free wheels, the longitudinal bars being aligned with the flanges of the beams, the rotatable free wheels pressing the flanges of the beam against the at least one conveying belt;

a controllable router, the router being located in the cutting zone, said router being controllably movable substantially orthogonally and transversally with respect to the beam; and a controller including a hard disk for storing a predetermined perforation pattern, the controller being operatively connected to the conveying assembly, the detector and the router, the controller having an input for receiving the detecting signal and outputs for sending control signals to:

the at least one conveying belt, to control the translation speed;

the pair of longitudinal bars, to press or free the flanges of the beam; and the router, to move the router closer or away from the beam, or to transversally translate the router;

and thereby perforate the web of the beam following the predetermined perforation pattern.

6. The cutting apparatus according to claim 5, further comprising:

a second controllable router, the second router being located in the cutting zone, said second router being controllably movable substantially orthogonally with respect to the beam, the controller being operatively connected to the second router and further comprising:

an output for sending control signals to the second router to move the second router closer the beam to a cutting position, or away from the beam to an un-cutting position, whereby the second router, when in the cutting position, perforates the web with a longitudinal groove, corresponding to a portion of the predetermined perforation pattern.

7. The cutting apparatus according to claim 6, comprising a guide mounted to the second router and adapted to rest against one of the flanges of the beam when the router is in the cutting position.

8. The cutting apparatus according to claim 6, wherein the second router is movable following a slightly slanted trajectory towards the cutting position, for facilitating a perforation of beam at the junction of the web and one of the flanges.

9. The cutting apparatus according to claim 5, further comprising:

linkages for supporting the longitudinal bars, the linkages being affixed to the support structure at one end and affixed to one of the bars at another end, for raising or lowering the rotatable free wheels against the longitudinal flanges of the wooden beams.

10. The cutting apparatus according to claim 9, wherein the linkages are controlled by the controller, the controller further comprising outputs for sending control signals to the linkages, to press or free the beam in response to the detecting signal.

11. The cutting apparatus according to claim 5, wherein the predetermined perforation pattern includes at least one trapezoidal opening, for which parallel edges of said trapezoidal opening are parallel to the flanges of the beam.

12. The cutting apparatus according to claim 1, wherein the translation speed is positive or negative, for respectively allowing a longitudinal translation of the beam in a forward or backward direction.

13. The cutting apparatus according to claim 1, wherein the predetermined perforation pattern includes multiple arc-shaped openings.

14. The cutting apparatus according to claim 1, wherein said at least one conveying belt comprises a pair of spaced-apart flat belts.

15. The cutting apparatus according to claim 14, wherein at least one of the pair of spaced-apart flat belts is movable transversally to adjust to the transverse height of the beams.

16. The cutting apparatus according to claim 1, further comprising a motorized feeding wheel located upstream of the cutting zone, the controller being operatively connected to the motorized feeding wheel, for regulating entry of the beam into the cutting zone.

17. The cutting apparatus according to claim 5, wherein said at least one conveying belt comprises a pair of spaced-apart flat belts.

18. The cutting apparatus according to claim 17, wherein at least one of the pair of spaced-apart flat belts is movable transversally to adjust to the transverse height of the beams.

19. The cutting apparatus according to claim 5, further comprising a motorized feeding wheel located upstream of the cutting zone, the controller being operatively connected to the motorized feeding wheel, for regulating entry of the beam into the cutting zone.

20. The cutting apparatus according to claim 1, further comprising roller conveyors placed downstream and upstream of the cutting zone.

* * * * *